Nov. 22, 1955  R. M. BURMEISTER  2,724,230
LAWN EDGE TRIMMER
Filed Oct. 12, 1953
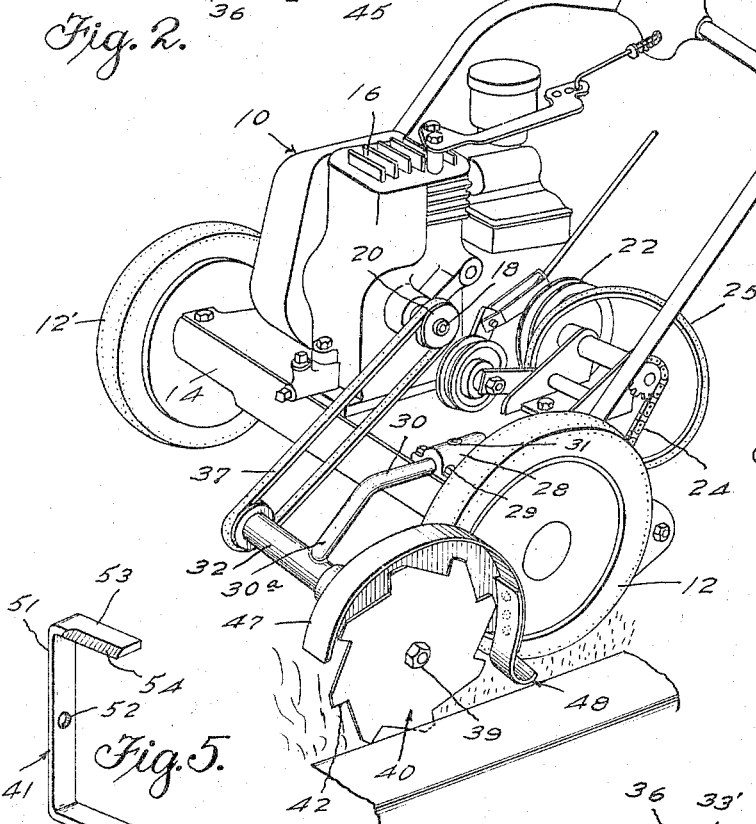
INVENTOR.
Robert M. Burmeister
BY Wilfred E. Lawson
ATTORNEY.

United States Patent Office 2,724,230
Patented Nov. 22, 1955

2,724,230

LAWN EDGE TRIMMER

Robert M. Burmeister, Pasadena, Calif.

Application October 12, 1953, Serial No. 385,576

1 Claim. (Cl. 56—25.4)

This invention relates generally to the class of mowers and is directed particularly to improvements in edge trimming devices.

A principal object of the present invention is to provide a device designed as an attachment for a power lawnmower, by means of which the effective trimming of grass can be accomplished along the edges of walks and in other places.

Another object of the invention is to provide an edge trimming attachment for a power lawnmower which can be mounted upon the power mower without altering the present structure of the mower and which can be driven from the power source which is used for operating the power mower, to trim along the edges of walks, flower beds and the like to effect the cutting of weeds and tall grass growing along the edge of a walk or flower bed.

A still further object of the invention is to provide an attachment of the character stated, having as a feature thereof a novel depth regulating means for the rotary trimming blade.

Other objects and advantages of the invention will become apparent as the description of same proceeds and the invention will be best understood from a consideration of the following detailed description taken in connection with the accompanying drawing forming a part of the specification, with the understanding, however, that the invention is not to be limited to the exact details of construction shown and described since obvious modifications will occur to a person skilled in the art.

In the drawing:

Figure 1 is a fragmentary view in perspective of a standard make of power lawnmower, showing the trimming attachment of the present invention applied thereto.

Figure 2 is a fragmentary view in perspective of the trimming attachment looking at the same from the opposite side from that shown in Figure 1.

Figure 3 is a view in side elevation of the attachment, showing the manner of adjusting the guard and depth control.

Figure 4 is a detailed section taken substantially on the line 4—4 of Figure 3.

Figure 5 is a view in perspective of the weed cutter detached from the rotating shaft.

Figure 6 is a sectional view similar to that of Figure 4, illustrating the mounting of the weed cutter for use independently of the edge trimming cutter, the weed cutter being partly in section and the guard in section.

Figure 7 is a sectional view similar to those in Figures 4 and 6 and illustrating the mounting of the weed cutter for use in conjunction with the edge trimming cutter, the latter and the guard being in section and the weed cutter partly in section.

Referring now more particularly to the drawing, the numeral 10 generally designates the power mower of a standard make.

The mower 10 comprises the two traction wheels 12 and 12', between which is supported a platform 14 on which is mounted the power plant which is generally designated 16 and which is here shown as comprising an internal combustion engine, from the side of which extends the power shaft 18 on which is secured the power delivering pulley 20.

The numeral 22 designates a second pulley which is operatively coupled by means of a chain drive 24 with the rotary cutter blades, not shown, of the machine and the power is transmitted from the pulley 20 to the pulley 22 by means of the belt 25.

The operator of the power mower controls the movement of the machine by means of the conventional handlebar structure which is generally designated 26.

In accordance with the present invention there is provided a mounting block 27 which is formed to provide a sleeve 28 and which is secured upon the platform 14 by bolts 29, so that the long axis of the sleeve is directed forwardly as illustrated in Figure 1.

Adapted to extend into the sleeve 28 of the mounting block is an arm 30 which is secured in place by a set screw 31 which is threaded through the sleeve in the top thereof, as shown, and engages the arm 30 to hold it against turning and against forward and rearward movement.

The forward end of the arm 30 is turned down slightly as indicated at 30a and secured to the forward end of the arm or the turned down portion, is the sleeve 32, which is disposed transversely of the forward end of the arm.

The mounting block 27 is positioned on the platform 14 so that the outer end of the sleeve 32 will extend across the periphery of the adjacent wheel 12 and to a slight distance beyond the wheel for the purpose about to be described.

Secured in the two ends of the sleeve 32 are bearings 33 and 33' and extending through the sleeve and through the bearings 33 and 33' is a shaft 34 which has secured to its inner end by the set screw 35, a pulley 36. This pulley is positioned in line with the pulley 20, so that the two pulleys can be connected by the power belt 37 for the transmission of rotary power from the shaft 18 to the shaft 34.

The outer end of the attachment shaft 34 is screw-threaded, as indicated at 38, to receive the two nuts 39 between which are secured on the shaft, a cutting implement of the disk type, as indicated at 40, or a weed cutter, such as that indicated at 41, or both cutters may be secured on the shaft together, in the manner illustrated in Figure 7.

The disk cutter 40 is provided with the peripheral teeth 42 and when it is mounted on the shaft 34 and secured in position by the nuts 39 and the necessary rotary is applied to the shaft 34 the disk cutter will rotate in the direction indicated by the arrow in Figure 3.

The angular disposition of the arm 30 is such that when the power mower is in its normal operating position the edge of the cutter 40 will be elevated out of contact with the ground and the mower can then be used in the conventional manner by connecting the belt 25 between the pulleys 20 and 22, the belt 37 being removed.

When it is desired to use the rotary disk cutter 40, or the cutter 41 shown in Figure 5, the operator elevates the handle bar 26 lightly to lower the cutter to the ground.

In order to regulate the depth of cut of the blade 40 the following structure is provided.

The numeral 43 generally designates the cutter guard which comprises a semicircular plate 44 from the center of which extends the hub 45 in which is inserted the outer end of the sleeve 32. The hub is secured to the sleeve by the set screw 46.

The periphery of the plate 44 carries the arcuate guard flange 47, which covers the edge of the disk 40, as is clearly shown in Figures 4 and 7.

To the rear end of the flange 47 there is a secured a depth gauge which is generally designated 48 and which comprises an elongate plate portion 49 which is secured against one face of the flange, here shown as the inner face. The lower end of this plate is formed into the semicircular ground engaging shoe 50, which is positioned to have the outer or convex face in opposed relation with the ground and with the free end extending upwardly and rearwardly with respect to the cutter guard.

By loosening the set screw 46 of the cutter guard, the guard can be turned on the sleeve 32 to raise or lower the depth gauge 48, as illustrated in full and in broken lines in Figure 3, so that when the handle bars are elevated slightly, as above stated, to lower the blade 40 into cutting position, the depth gauge will come into contact with the ground when the edge of the cutting disk has penetrated the side to the desired extent.

As will be clearly seen in Figure 6, the disk cutter 40 can be replaced by the weed cutter 41. The weed cutter comprises the long bar 51, having a central opening 52 to receive the end of the shaft 34 and each end of the bar has the outwardly extending short blade 53 which has one edge sharpened as at 54. When the weed cutter is fixed to the shaft 34 and the latter rotated the blades 53 will turn in the proper direction to cut the grass or weeds at the proper height above the ground surface in accordance with the setting of the depth gauge 48.

The disk cutter 40 and weed cutter 41 may be used in combination as shown in Figure 7, both being secured in side by side relation on the shaft by the nuts 39, so that a combined edge trimming operation and grass and weed cutting operation can be performed.

While the present attachment has been designed primarily as an edge trimming apparatus it can also be used for other purposes as by putting a woodsaw blade on the shaft 34 in place of the disk blade or cutter 40 to cut up three trimmings or the blade can be replaced by an emery wheel for use in sharpening tools of all kinds.

While the mounting block 27 has been shown and described as having a tubular passage or sleeve 28 to receive the bar 30, which has been shown as of circular form, it is to be understood that the invention is not limited to this specific construction since the block 27 may be provided with a sleeve having a rectangular opening and the bar 30 can be of rectangular cross section if desired.

I claim:

In a powered lawn mower, including traction wheels, a platform carried by said wheels, and an operating engine on the platform and having a power takeoff; an edge trimmer comprising an arm attached at one end to the platform and extending forwardly therefrom, a sleeve supported transversely on the free end of said arm, bearings mounted within the ends of said sleeve, a shaft extending through said sleeve and the bearings and having an end projecting beyond one of the traction wheels, a toothed circular cutter carried on the projecting end of said shaft for rotation therewith, a guard for said cutter supported by the sleeve and having an arcuate portion extending about the upper and rear periphery of the cutter, means coupling said guard with the sleeve by which the guard can be turned thereon relatively to the cutter, and an arcuate shoe, constituting a gauge element, carried at the rear end of said arcuate portion for supporting the cutter at the required height above the ground.

References Cited in the file of this patent

UNITED STATES PATENTS

| | | |
|---|---|---|
| 1,770,434 | Schleicher | July 15, 1930 |
| 2,515,732 | Parry | July 18, 1950 |
| 2,521,033 | Bell | Sept. 5, 1950 |
| 2,538,230 | Boggs | Jan. 16, 1951 |
| 2,597,017 | McKinstry | May 20, 1952 |
| 2,614,473 | Yacoby | Oct. 21, 1952 |
| 2,618,919 | Hutchens | Nov. 25, 1952 |
| 2,632,990 | Stricklen et al. | Mar. 31, 1953 |
| 2,663,137 | Asbury | Dec. 22, 1953 |
| 2,676,447 | Asbury | Apr. 27, 1954 |